(12) United States Patent
Tillis

(10) Patent No.: US 10,204,525 B1
(45) Date of Patent: Feb. 12, 2019

(54) SUGGESTION-BASED VIRTUAL SESSIONS ENGAGING THE MIRROR NEURON SYSTEM

(71) Applicant: JeffRoy H. Tillis, Sherman Oaks, CA (US)

(72) Inventor: JeffRoy H. Tillis, Sherman Oaks, CA (US)

( * ) Notice: Subject to any disclaimer, the term of this patent is extended or adjusted under 35 U.S.C. 154(b) by 452 days.

(21) Appl. No.: 14/716,609

(22) Filed: May 19, 2015

Related U.S. Application Data

(63) Continuation of application No. 13/233,930, filed on Sep. 15, 2011, now abandoned, which is a
(Continued)

(51) Int. Cl.
*G09B 5/00* (2006.01)
*G09B 5/02* (2006.01)
*G09B 19/00* (2006.01)

(52) U.S. Cl.
CPC .............. *G09B 5/02* (2013.01); *G09B 19/00* (2013.01)

(58) Field of Classification Search
CPC ............. G09B 5/02; G09B 19/00; G09B 9/00
See application file for complete search history.

(56) References Cited

U.S. PATENT DOCUMENTS

| | | | |
|---|---|---|---|
| 5,577,981 A | 11/1996 | Jarvik | |
| 6,244,987 B1 | 6/2001 | Ohsugak et al. | |
| 6,425,764 B1 | 7/2002 | Lamson | |
| 6,724,385 B2 | 4/2004 | Takatsuka et al. | |
| 6,894,686 B2 | 5/2005 | Stamper et al. | |

(Continued)

OTHER PUBLICATIONS

Marc Saltzman, NBA Live 2000—Despite new entries to the PC basketball court, NBA Live 2000 still slam dunks the competition, Dec. 8, 1999, PC Review at IGN (http://pc.ign.com/articles/161/161692p1.html).
(Continued)

*Primary Examiner* — Timothy A Musselman

(57) ABSTRACT

Improved methods for rehabilitation, transformation, training, and learning are provided for a person as a viewer which enable the viewer to experience a virtual session, comprised of one or more virtual scenarios intended to activate the mirror neuron system, that includes suggestion, hypnosis, hypnotic induction and/or hypnotic suggestion in verbal and/or visual forms, where said suggestion, hypnotic induction and/or hypnotic suggestion may possibly be applied to and/or utilized in relationship with the various components and/or aspects individually and/or collectively that make up a virtual session which are presented in this description of the present invention, which includes one or more virtual scenarios, a virtual character which may be created to be in the likeness of the viewer, where said virtual character and possibly additional virtual characters that are human and/or non-human may be animated to properly perform one or more acts and/or motions and/or movements and possibly express dialog and/or speak and/or otherwise be represented to speak and/or think and/or make sound, where said virtual character made in the likeness of the viewer may be animated to speak and/or otherwise be represented to speak and/or think using the voice of the viewer themselves, that may include other audio, including narrative-based and/or the virtual character(s) expressing verbal hypnotic suggestion(s), hypnotic guidance, hypnotic instruction(s), and/or suggestion(s), guidance, instruction(s), and/or similar, which may be viewed from one or more perspectives and/or one or more points of view, may include one or more virtual environments, locations, special effects, weather, and/or similar, being displayed through video based imagery and/or computer-based imagery, in 2D, 2D stereo, 3D, 3D stereo, and/or more advanced methods such as holography, with the viewer experiencing the virtual scenario through playback and possibly passively, actively, and/or with interactivity using proper apparatus, with the virtual session allowing for
(Continued)

data collection, and the viewer experiencing the virtual session alone and/or with assistance, for rehabilitation, transformation, training, and learning.

20 Claims, 5 Drawing Sheets

Related U.S. Application Data continuation-in-part of application No. 12/002,411, filed on Dec. 14, 2007, now abandoned.

(56) References Cited

U.S. PATENT DOCUMENTS

| | | | |
|---|---|---|---|
| 7,084,876 B1 | 8/2006 | Fogel et al. | |
| 7,217,224 B2 | 5/2007 | Thomas | |
| 7,637,847 B1 | 12/2009 | Hickman | |
| 7,761,300 B2 | 7/2010 | Klinger | |
| 2001/0001303 A1 | 5/2001 | Ohsuga et al. | |
| 2003/0156134 A1 | 8/2003 | Kim | |
| 2004/0152512 A1 | 8/2004 | Collodi et al. | |
| 2006/0122035 A1 | 6/2006 | Felix | |
| 2006/0244750 A1 | 11/2006 | Kim | |
| 2006/0247489 A1 | 11/2006 | Carbis et al. | |
| 2007/0082324 A1 | 4/2007 | Johnson et al. | |
| 2007/0298866 A1* | 12/2007 | Gaudiano | A63F 13/00 463/23 |
| 2008/0191864 A1* | 8/2008 | Wolfson | G06F 3/011 340/524 |
| 2009/0023554 A1 | 1/2009 | Shim | |
| 2010/0022354 A1 | 1/2010 | Fisher | |
| 2010/0035726 A1 | 2/2010 | Fisher et al. | |

OTHER PUBLICATIONS

VirtuRealm Flash Presentation, dated Jun. 20, 2002, in 72 pages.
VLR Presentation, dated Jun. 2014, in 33 pages.

* cited by examiner

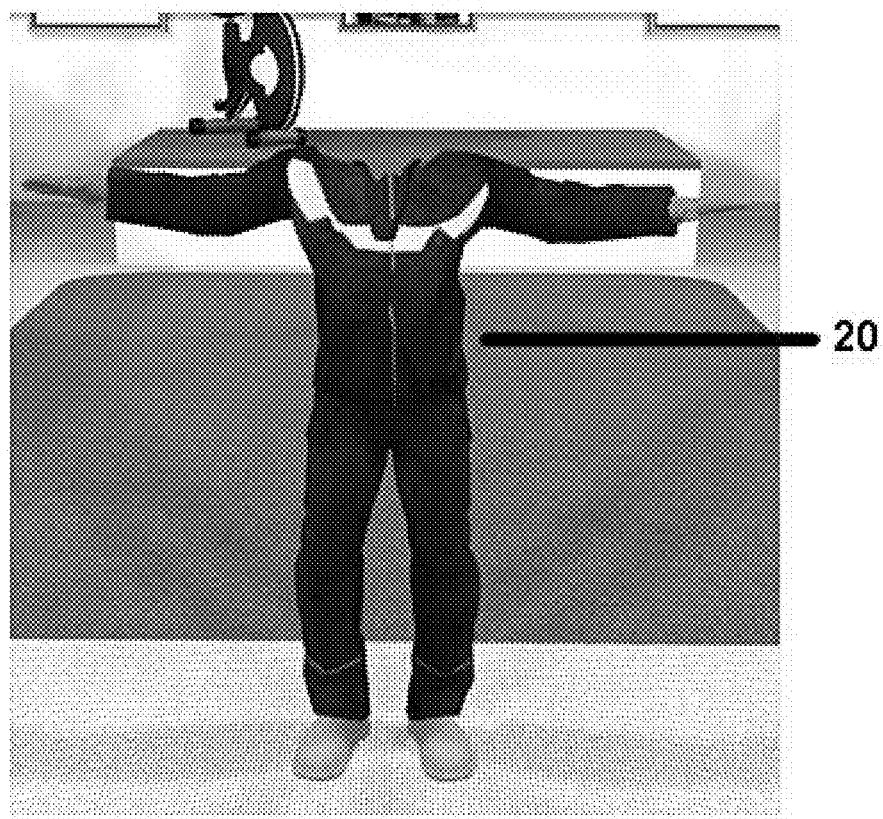
Figure 1
A      Figure 2      B

SUGGESTION-BASED VIRTUAL SESSIONS ENGAGING THE MIRROR NEURON SYSTEM

CROSS-REFERENCES TO RELATED APPLICATIONS

This is a continuation of U.S. patent application Ser. No. 13/233,930, filed Sep. 15, 2011 and entitled "Suggestion-based Virtual Sessions Engaging The Mirror Neuron System", which is a continuation-in-part of U.S. patent application Ser. No. 12/002,411, filed Dec. 14, 2007 and entitled "Virtual Scenarios", which are hereby incorporated by reference herein in their entireties.

FIELD OF THE INVENTION

This invention relates to rehabilitation, transformation, training, and learning, and is particularly directed to improved methods for rehabilitation, transformation, training, and learning by employing hypnotic virtual scenarios designed to engage the mirror neuron system and presented through video based imagery and/or computer based imagery.

BACKGROUND OF THE INVENTION

Part 1—Suggestion:

Suggestion is the psychological process whereby the thoughts, feelings, behavior, and perception of a subject are affected by influences such as verbal guidance. Suggestion is sometimes referred to "waking suggestions" because they are given in the absence of hypnosis. Suggestion can produce strong changes in perceptual experience and are given in precisely the same way as "hypnotic suggestions" (i.e., suggestions given within hypnosis). Early researchers such as Hull conducted experiments on suggestion [1]. More recently, experiments investigating suggestion were conducted by researchers such as Nicholas Spanos and Irving Kirsch, revealing strong correlation between people's responses to suggestion both in and outside hypnosis [2]. Although suggestion does not rely on a subject being under hypnosis in order to effect change, suggestion is considered one of the two primary components of a formal hypnotic experience.

Part Two—Hypnosis:

Hypnosis is a state of inner absorption, concentration and focused attention. Hypnosis can be thought of consisting of two primary components: trance and suggestion. [3]. Recent research supports the view that hypnotic suggestions and visualization effectively changes aspects of the person's physiological and neurological functions.

When using hypnosis, the subject is guided to respond to suggestions for changes in subjective experience, alterations in perception, sensation, emotion, thought, or behavior. If the subject responds to hypnotic suggestions, it is generally inferred that hypnosis has been induced. Many believe that hypnotic responses and experiences are characteristic of a hypnotic state.

Details of hypnotic procedures and suggestions will differ depending on the goals of the practitioner and the purposes of the clinical or research endeavor. Procedures traditionally involve suggestions to relax, though relaxation is not necessary for hypnosis and a wide variety of suggestions can be used including those to become more alert. Suggestions that permit the extent of hypnosis to be assessed by comparing responses to standardized scales can be used in both clinical and research settings. Further, hypnosis does not require that the subject's eyes be closed.

Clinical hypnosis is an altered state of awareness, perception or consciousness that is used, by licensed and trained doctors or masters prepared individuals, for treating a psychological or physical problem. It is a highly physically relaxed and mentally focused state. Practitioners using clinical hypnosis encourage the use of imagination, as mental imagery is very powerful, especially in a focused state of attention.

Mental imagery, mental rehearsal, and visualization are terms that can be used to describe an experience that resembles a real world scenario without actually being in that real world. All three can include "audio" as a component of the overall experience. Mental imagery has been described as holding within one's mind a vivid representation of a task as if it had already happened. The theory underlying mental rehearsal suggests that when we mentally 550174.1 image a motor behavior we are creating neural patterns of the accurate task we intend to perform [35, 36]. Mental imagery can be used to improve confidence, problem solve, reduce anxiety, and improve performance of a motor task. Additionally, it has been used in a variety of fields such as the arts, sports, business, alternative medicine and psychology. For example, Olympic divers may "visualize" themselves performing a dive without ever entering the water. Studies show that motor imagery and motor performance possess similar neural substrates [37]. Mental imagery has also been shown to be effective in motor rehabilitation and has potential as a cognitive strategy for functional recovery from stroke [4,38-43].

A subject's ability to engage with mental imagery can be enhanced when under hypnosis. Research shows that using imagery while under hypnosis, even if only symbolic, assists in bringing about the things being imagined. In the medical field, hypnosis is used to reduce side effects of medical procedures, reduction and control of pain, control of bleeding, and accelerate healing, among other medical applications.

Part 3—Mirror Neuron System:

Mirror neuron activity was discovered in the 1990's through brain imaging technologies. It was discovered that certain brain cells in the frontal lobe premotor cortex activate when humans and primates perform actions such as reaching for something or pulling a lever. These brain cells are called the motor command neurons [12, 13]. It was discovered that a subset of these motor neurons were activated when a human or primate watched someone other than themselves perform the same action [6, 10]. Located in the fronto-parietal region of the brain, this subset is referred to as the mirror neuron system [14].

Visual interventions using human or other stimulus focus have been incorporated in investigations of the mirror neuron system. These visual interventions have employed both video and virtual reality [8, 9]. Living characters performing real world, everyday tasks being recorded on video is one of the most common approaches. Examples of this include the recording of mirror neuron activation when human subjects watched videotapes of forms of communication including humans talking, dogs barking, and an ape's pursed lips [10]. Mirror neuron activity was provoked only when watching the video of humans talking. This suggests that content of the visual stimulus must be relevant and relatable to humans in order to activate the human mirror neuron system. Noted here is the fact that the video is of someone other than the viewer is performing the task.

The mirror neuron system becomes active when we move, when we observe another person moving to perform a task (action-observation), and also when we intend to move (observation with intent to imitate). When observation and movement are combined there is a greater response in the mirror system than when either is performed alone [19]. Also, research has shown the importance of sense of self and purpose when engaging the human mirror neuron system. It has been shown that one observing an effector results in the activation of their mirror neuron system, and that the type of effector and relationship to the observer has a significant impact on the level of mirror neuron activity, as well as be a determining factor on the observer's ability to interpret inferred motion. When observers cannot interpret inferred motion, for example in the case of a robotic effector (machine arm/hand) [18], the mirror neuron system is least active. When observing a human effector (human arm/hand) and is able to interpret inferred motion, the observer's mirror neuron system becomes more active. Mirror neuron activity increases with the ability to interpret inferred motion increases. This occurs when an observed human effector performs an action that represents receiving or gaining something, such as drinking a cup full of tea. Mirror neurons are activated less when the human effector has the goal of merely performing an action, such as cleaning the empty tea cup [8]. It has also been discovered that individuals with autism show increased mirror neuron system response when they observe a familiar person rather than a stranger performing a movement, and an even greater mirror neuron response when they observe themselves perform a movement [11]. These findings demonstrate the importance of sense of self and purpose when engaging the human mirror system.

It is believed the mirror neuron system [15-17] may represent the underlying neurophysiological substrate for therapeutic intervention based on action-observation-intention. Action observation has been shown to enhance physiological motor rehabilitation [5]. Further, intention is an important component of physiological motor rehabilitation—the intention of the individual to move their impaired limb [7]. For example, in a stroke patient, a set of neurons that form the basis for movement generation may be subserved through the patient observing movements, imagining movements and attempting through intention to perform task specific movements. A recent study demonstrated that action observation combined with physical practice congruent with the action observed, can enhance the effects of motor training after stroke [20].

Mirror neuron system activation engaged through purpose and self, observation, and intention, can be facilitated and optimized through the methods of the present invention, and can be applied to motor rehabilitation, as well as to the areas involving transformation, training, or learning.

Part 4—Virtual Reality:

Virtual Reality (VR), as applied to computer simulated environments, provides physical presence to users through the display of virtual environments. VR presentations are typically presented on a computer screen, a video display, or a head-mounted display (HMD), and can be presented in 2D, 3D, or stereo 3D. VR environments are typically visual experiences, however other forms of sensory information such as sound, and tactile information, such as haptics that provide user input to the VR application or force-feedback to the user, are also utilized in the experience. The VR environment can simulate an imaginary environment, as in VR games, or the real world as a lifelike experience, such as combat or medical simulations. VR allows the participant to enter a simulated world through multi-modal sensory feedback, and has been used for the training of motor tasks involving highly complex activities such as surgical techniques [21], flight simulation [22], and military exercises [23].

VR has recently been used in a therapeutic role in various forms. One area of therapeutic VR is exposure therapy, such as in phobia treatments, addiction, and treating PTSD. In treating phobia, VR can provide exposure to a phobic experience through a virtual environment that represents a true exposure. For addiction, VR is used to provide a virtual environment that provides cues to the addictive substance in a social setting. Recently, the U.S. Navy piloted a treatment based upon a video game developed using a real time VR game engine that consisted of a relatively complex simulation of urban combat settings that was used to immerse veterans suffering from PTSD. For phobia, PTSD, and addiction, exposing the patient to their fear, trauma, or source of addiction through VR based simulation leads to desensitization to the associated experience and results in a significant reduction in symptoms.

Other therapeutic fields that research is being conducted on the use of VR include rehabilitation, physical therapy, and occupational therapy. One example of adult rehabilitation involves patients in the chronic phase following stroke suffering from the resultant neurological dysfunction. The VR intervention applied to these patients focused on retraining faulty movement patterns and augmenting rehabilitation of the upper limb [24,25]. VR has also been used for lower limb motor rehabilitation in stroke patients.

Substantial effort and expertise has been focused on developing these innovative technology based interventions to exploit the neuroplastic properties associated with the sensorimotor systems in the adult brain. Specifically, these efforts have investigated the use of robotics, virtual reality computer games, intensive therapeutic exercise such as Constraint Induced Movement Therapy (CIMT), Accelerated Skill Acquisition Program (ASAP), and mental practice [26-31]. While most current studies are laboratory based, expensive, and have used small sample sizes, promising trends have been established for improving hand function [24,25,32] and locomotor activity [33] in individuals with chronic stroke. Gains achieved through practice in virtual environments have been shown to carry over in real-world activity, sometimes resulting in functional improvement in activities of daily living [24, 32].

There are fundamental and dramatic advantages inherent in the use of VR approaches for treating cognitive, motor, and behavioral impairments in individuals post stroke. VR offers an ideal core technology because it allows for the creation of computer generated 3D simulations, within which hierarchical task relevant challenges can be delivered and titrated across a range of difficulty levels [34].

In this way, an individual's treatment plan can be customized to begin at a stimulus level that is appropriate and focused on their goals. VR allows for the presentation of more ecologically relevant stimuli that are embedded in meaningful and familiar contexts. By designing VR environments that not only "look like" the real world, but actually incorporate challenges that require "real world" functional behaviors, the ecological validity of cognitive/motor interventions can be enhanced and return to work is more likely. Within such simulations, the complexity of stimulus challenges found in naturalistic settings can be delivered while still maintaining the experimental control required for rigorous scientific analysis and replication.

Part 5—Augmented Reality:

One definition of Augmented Reality (AR) is an experience of a live view of a real world environment in real time through a viewing component connected to a computer that augments elements of the real world environment by overlaying virtual content over the real world environment. Overlays may be positioned relative to the real world elements in one of several ways, including orientation and positioning tracking facilitated by GPS, gyroscopes, and accelerometers, or computer vision pattern recognition that reads patterns on paper or similar that are placed on particular real world environment elements and are the target for augmented virtual overlays. A more advanced form of computer vision pattern recognition involves recognizing objects themselves. Overlays may be 2D or 3D objects, animated characters, or text-based information, among other things.

AR is still in its infancy relative to the other technologies mentioned here. This is particularly true in rehabilitation, transformation, training, and learning.

Part 6—Video:

Different forms of video have been used for many years in the areas of rehabilitation, transformation, training, and learning. Videos of actors performing specific motion have been used to engage the mirror neuron system in efforts to assist in the rehabilitation of stroke patients. In cases where video records live motion in real time for playback at a later time, a stroke patient cannot get a video of themselves performing the prescribed motion that would be used to assist in their rehabilitation.

DESCRIPTION OF THE RELATED ART

In the fields of rehabilitation, transformation, training, and learning, many methods for achieving a desired goal employ visually-based methods. These methods range from internal processes where individuals use hypnosis, mental practice, and visualization, to methods involving external processes utilizing video-based imagery or computer-based imagery. In recent years it was discovered that the mirror neuron system becomes active when viewing individuals performing motion, with both internal and external processes being employed to engage the mirror neuron system.

Methods involving internal processes such as suggestion, hypnosis, mental practice, and visualization have often been used to accomplish goals primarily related to rehabilitation and transformation. Suggestion has been used for pain control, phobias, anxiety, panic attacks, among others. Hypnosis has been used for pain control, cancer treatment, stroke, phobias, anxiety, panic attacks, eating disorders, obesity, and smoking cessation, among others. Hypnosis typically uses suggestion and/or visualization and/or guided visualization to achieve the desired result. Further, hypnosis works to optimize focused attention, thought to be one of the most important aspects of a hypnotic experience. Mental practice also uses concentration and/or visualization. Visualization alone is sometimes used to achieve desired results. Generally, in all 550174.1 examples provided here, due to the exclusive reliance of the person's ability to visualize, focus, and concentrate, these methods provide only moderate success.

Methods involving external processes such as video-based imagery and/or computer based imagery have also been used to accomplish goals related to rehabilitation and transformation. Video-based methods can take several forms, including the recording of live motion as in a typical movie, or a rendered 2D or 3D animation output as video. Computer-based methods can take several forms, including Virtual Reality (VR), Augmented Reality (AR), or advanced methods such as holography or similar technologies. These video-based or computer based methods can be two-dimensional (2D) or three-dimensional (3D), which in either case may be recorded, static, animated, and/or interactive and presented in monographic and/or stereo graphic output.

Research efforts to learn about the mirror neuron system have employed various visually-based approaches, some video based and others computer based. In both cases, users viewed images of other individuals perform motion, however it was discovered that an individual's mirror neuron system is engaged most when seeing images of themselves perform motion. In either case, focused attention when viewing such visual stimulus optimizes the activation of the mirror neuron system.

It is well known that using VR assists in the rehabilitation of persons by allowing a person to view videos and/or computerized images of another person performing a desired act and subsequently having the person attempt to perform the desired act by following the example just seen. Such techniques employ the mirror neuron system and have been used in rehabilitation of persons who have lost mobility due to strokes or accidents. One small VR based study showed that persons improve significantly in their rehabilitation if they can view images of themselves performing prescribed physical motion. The difficulty lies in the fact that most persons do not have videos and/or computerized images of themselves performing such motion. VR is also used extensively in training and learning. VR based applications have been developed for equipment maintenance, combat training and flight simulations, and medical applications. VR is also used for online learning applications.

In the area of transformation, videos and/or computerized images of a person different than the viewer are used to assist in motivating overweight persons to lose weight. In the areas of training or learning, examples of similar use of videos and/or computerized images of a different person than the viewer performing include sports techniques, such as golf swings, running form, martial arts, etc. In these examples provided and similar, the videos and/or computerized images do not use the person themselves as the person being viewed.

With regard to rehabilitation, transformation, training, and learning, the prior art works independently of each other, and therefore lack the optimal effect. When incorporating imagery of individuals performing motion, video-based imagery and/or computer-based imagery can be used to engage the mirror neuron system. Research has shown that that an individual's mirror neuron system is engaged most when seeing images of themselves perform motion. Optimizing mirror neuron activity requires focused attention. Hypnosis works to optimize focused attention. Suggestion works to effect change. At the present time, video-based methods and/or computer-based methods do not combine the use of a virtual character made to be the likeness of the user them self-combined with hypnosis and suggestion to optimize mirror neuron activity.

Thus, none of the prior art rehabilitation, transformation, training, or learning techniques have been entirely satisfactory.

SUMMARY OF THE INVENTION

These disadvantages of the prior art are overcome and improved methods for rehabilitation, transformation, training, and learning are provided with the present invention for a person as a viewer which enable the viewer to experience a virtual session, comprised of one or more virtual scenarios intended to activate the mirror neuron system, that includes suggestion, hypnosis, hypnotic induction and/or hypnotic suggestion in verbal and/or visual forms, where said suggestion, hypnotic induction and/or hypnotic suggestion may possibly be applied to and/or utilized in relationship with the various components and/or aspects individually and/or collectively that make up a virtual session which are presented in this description of the present invention, which includes one or more virtual scenarios, a virtual character which may be created to be in the likeness of the viewer, where said virtual character and possibly additional virtual characters that are human and/or non-human may be animated to properly perform one or more acts and/or motions and/or movements and possibly express dialog and/or speak and/or otherwise be represented to speak and/or think and/or make sound, where said virtual character made in the likeness of the viewer may be animated to speak and/or otherwise be represented to speak and/or think using the voice of the viewer themselves, that may include other audio, including narrative-based and/or the virtual character(s) expressing verbal hypnotic suggestion(s), hypnotic guidance, hypnotic instruction(s), and/or suggestion(s), guidance, instruction(s), and/or similar, which may be viewed from one or more perspectives and/or one or more points of view, may include one or more virtual environments, locations, special effects, weather, and/or similar, being displayed through video based imagery and/or computer-based imagery, in 2D, 2D stereo, 3D, 3D stereo, and/or more advanced methods such as holography, with the viewer experiencing the virtual scenario through playback and possibly passively, actively, and/or with interactivity using proper apparatus, with the virtual session allowing for data collection, and the viewer experiencing the virtual session alone and/or with assistance, for rehabilitation, transformation, training, and learning.

Merging particular technologies identified above allows physical and non-physical conditions and characteristics of a person to be transformed. The present invention would allow the viewer to see a virtual character, possibly made in their likeness, engage with a conditional process through a virtual scenario that utilizes suggestion and/or hypnosis, activates the mirror neuron system, and has a programmed outcome(s) to condition physical and/or behavioral transformations and changes in a direct and powerful way that provides for the augmentation, alteration, or replacement of existing behavioral and/or physical patterns. There are numerous areas that this technology can be applied to. Examples of military applications could include combat training, shock inoculation, and Post Traumatic Stress Disorder (PTSD). Medical applications could include stroke, traumatic brain injury, spinal cord injury, burn victims, pain control, substance abuse, addiction, and autism spectrum disorder. Other applications could include stress management, weight loss, athletics, and general self-improvement, among other areas.

Research shows engaging the mirror neuron system to more completely leverage the plastic, adaptive properties of the human brain has the potential to significantly enhance task-oriented therapy. These important benefits can work toward achieving a greater degree of personal improvement in motor impairment recovery, and may significantly enhance motor training, recovery, and/or motor enhancement. Studies have shown that the human mirror neuron system is activated by visual stimulation [6]. In terms of rehabilitative effect, and a recent review suggested that the mirror neuron system may provide useful circuitry to enhance of the severely affected upper limb early after stroke [7]. Further, there is also recent empirical support for using observation with intent to imitate in stroke rehabilitation to augment physical therapy and promote motor function [5].

A virtual session is comprised of one or multiple virtual scenarios intended to activate the mirror neuron system. The content of a virtual scenario can be comprised of any number of components appropriate for its intended purpose and/or goal. A virtual scenario may contain suggestion and/or hypnotic elements that can be audio and/or visual. A virtual scenario mayor may not be interactive. A virtual scenario may be an interstitial that presents guidance, information, or provide a lead into a virtual scenario that follows. A virtual scenario could include an individual's virtual character made in the likeness of him/her and/or include virtual characters animated using key-frame or motion capture techniques to create pre-defined motion for the virtual characters and may allow for interactivity with the virtual character(s) or objects within the virtual world. A virtual scenario could also provide for data collection capabilities that will provide for the recording and analyzing of data of many types, including interactivity, attentiveness, duration/level of completion of the virtual session, date and time stamp, performance assessment, vigilance latency, etc.

A virtual scenario can literally provide the viewer with a vision of action and behavior of their virtual counterpart, allowing the viewer to "see themselves" perform within a virtual scenario that has prescribed performance and outcome through predefined visual, audio, and perhaps visceral stimulation of a scenario in which the subject sees themselves accomplish a desired action, possess a desired behavior, or experience a desired transformation. The viewer is provided with a virtual visualization that is consistent, definable, and repeatable.

Bringing the subject to the state of hypnotic suggestibility can be accomplished by verbal and non-verbal means, or by either one individually. The processes used in non-verbal induction include visual imagery, sound and light stimulation, sound stimulation, light stimulation, visual cues that are seen within the virtual environment configuration or from within the virtual setting the subject is placed in, CES, (Cranial Electrotherapy Stimulation), Biofeedback, sensory deprivation, sensory enhancement, or exposed to some form of visceral stimulation. These processes can be integrated into the virtual immersion configuration or the virtual setting in one of many combinations. Audio technology can be integrated that would allow the subject to hear themselves impart the verbal component whenever it is appropriate or desirable that their own voice be used.

The virtual sessions can be interactive or alterable by a controller that changes some of the conditions of a virtual scenario to build re-assessment capabilities. They see their virtual self or another virtual character, as well as from the point of view of their virtual self or another virtual character. Verbal suggestions based upon defined variables can be introduced. They see their virtual self and/or another virtual character focused, in control, and efficient. The virtual scenarios can be left open-ended in that no final result is programmed, leaving the intuitiveness instilled in the user to be brought to bear. The subject can be immersed in a virtual environment through the use of a virtual immersion headset and possibly the use of forms of sensory deprivation or forms of sensory stimulation, allowing for complete participation with the virtual session. Another possibility is to place the subject in a room that projects the virtual session using projections, and possibly holography, along with audio. A lower tech version that does not completely allow for immersion would be to use a laptop or tablet computer or smartphone or the like, which further may be used with 3D glasses to view the screen directly if the computer were to be displaying the content in stereo 3D.

In concert with these environments are trance inducing processes that bring the subject to a state of suggestibility. This brings the subject to a state of powerful focus, and this focus along with verbal and visual cues imprints a patterning that reflects the message of the visualization. Enhancing this is the ability of the virtual session to be repeated, allowing for multiple sessions to more completely anchor the message, as well as for the subject to refer to it at a future time if a "refresher" is desired. The virtual scenarios within a virtual session can also be progressive, in that the subject integrates with one level of accomplishment, and then in turn moves on to process an integration of a higher level of that accomplishment through a higher level virtual scenario.

The following describes an example of the present invention as it could be applied to stroke. In this example, the present invention uses hypnosis, a VR gaming type platform, and is paired with task-oriented therapy. In this example, relevant hypnotic suggestions are given associated with the virtual character's motion, disposition, mental and physical state, with the props and environment, with the purpose, goals, and positive outcome of the virtual session and the virtual scenarios, when appropriate. This is only one example and is not meant to limit the present invention in any way.

Examples of some specific components of the virtual session experienced when engaging with the present invention focused on stroke rehabilitation includes one or more virtual scenarios, with the virtual character made in the likeness of the patient which will consist of a virtual body matched to the patient's race and approximate weight, height, and body type. The virtual character is "clothed" in a top that has a high neck and long sleeves, and long pants and shoes. The personalized virtual head will be attached to the virtual body, with the head being created by laser scanning or 3D digitizing technology or other photogrammetric methods or taking one or more photographs to include the viewer's head and using computer program techniques to generate a virtual head in the likeness of the viewer to complete the virtual character. A patient's session consists of virtual scenarios, assessment sequences, and focus tests. Hypnosis will be incorporated using audio and visual means, in an induction process where the patient see their virtual self-perform one of many types of induction and! or guided relaxation, such as going down a staircase or an arm raising. Because the visualization is being presented to the patient virtually, the patient is, through suggestion, instructed to relax deeply, focus, and keep their eyes open. While in the hypnotic state, the patient will view the virtual scenario, receive the suggestions and activate their mirror neuron system. In the virtual scenario are props and scene elements appropriate to the specific goals (e.g. environment, room, table, chair, cups, etc.). Lighting will be added, and the camera points of view will be blocked. Narrative audio guides, directs, supports, and motivates the patient. The motion their virtual character performs is specific, smooth, and coordinated, accurately representing life-like movements depicting the successful achievement of prescribed goals, providing the patient a visualization that depicts the patient performing with repeated and consistent success. Interactivity will be used in several ways, including collecting patient attentiveness data, and allowing the patient to directly affect the motion of their virtual self. The interactivity from the patient will only be represented as a smooth, coordinated, specific motion performing and attaining the prescribed goal. The motion will always follow a defined, pre-programmed path. The patient interactive input will be translated into smooth, pre-directed motion to the virtual character, regardless of the quality of the patient's actual physical movement. The only stimulation visually activating the patient's mirror neuron system while using the present invention will result from observing motion that is smooth, coordinated, specific motion performing and attaining the prescribed goal. The patient observing their virtual self will never observe their virtual self-perform erratic, uncontrolled, or stressed motion. The patient sees his or her self in the form of a virtual character animated using high resolution motion capture to perform flawless, recognizable, complete, consistent motion from different points of view, achieving a positive goal. For example, the patient may have extreme difficulty holding and pouring a liquid into a cup when using their impaired arm. However, when viewing the virtual scenario, the patient sees their virtual self successfully pouring a liquid into a cup successfully with a smooth, coordinated, specific motion. Individual virtual scenarios can consist of a single specific task-oriented motion that can be recorded through key framing and/or motion capture that could represent a shoulder Range of Motion (ROM), elbow ROM, wrist ROM, or finger ROM tasks, among many others that could be recorded and attached to the virtual character. The patient will see their virtual character performing tasks with their virtual arm and hand representing how their impaired limb would perform fully functional and rehabilitated. Also, this type of interactivity will provide for the fulfillment of intention to imitate, a recognized important component in stroke rehabilitation. Both interactive and non-interactive scenarios will be within the session. Data collection capabilities will provide for the recording and analyzing of data of many types, including interactivity, attentiveness, duration/level of completion of the virtual session, date and time stamp, performance assessment, etc. An example of another type of data that could be collected is vigilance latency. Vigilance latency will be assessed by the subject's response latency to the Focus Test indicated above. The vigilance latency will consist of the response time to the transition from their virtual self-performing only a walk cycle to seeing the Focus Target begins when the words "PRESS SPACE BAR" appearing above the head of the character and the character raising both arms to extending fully upright waving the hands. Subjects will be instructed to respond with a manual indication (push the Space Bar on the keyboard) as soon as they detect the Focus Target. Vigilance latency (in seconds) will be measured from the time that the Focus Target begins to the time that the subject indicates detection (pushing the Space Bar on the keyboard). The response latency (movement time) to this alarm will be used as an indirect measure of workload. The workload density will be calculated by multiplying the duration of each task actually performed in that interval by that task's workload factor score.

The virtual session can be output to disc for installation into a laptop computer that is played as a real time platform run on a computer, displayed through a head mounted display, that allows for data collection, interactivity, and viewing output options. During a clinical therapy phase of a recovery program, patients can use the virtual session both in the lab and in the home. These virtual sessions can be used for remote therapy, with activities similar to those performed in the lab based physical therapy sessions. Virtual sessions could include props, such as a table, chair, or cups that are animated appropriately in relation to the virtual character. These could be related to what a participant would be using in the lab or virtual sessions that are not tied to lab based therapy sessions. Once clinical in-lab therapy sessions come to a close, the patient can then engage in the home with virtual sessions that are developed specifically for in-home use for remote follow-on therapy. In the case of remote follow-on therapy, the virtual session intervention could be engaged with using the VR platform that allows for internet interactivity and feedback to clinicians or other participants. This foundation would make several levels of remote therapy available for the user to use with in-home virtual sessions, including remote therapy working with a coaching avatar or a rehabilitation therapist, all the way to providing for a Massively Multiplayer Online Game/Community.

Because of the power and the use this technology can have, a new approach of learning, training, and transformation can be applied to a multitude of areas of application.

OBJECTS OF THE INVENTION

These advantages of the present invention are preferably attained by providing improved methods for rehabilitation, transformation, training, and learning for a person.

Accordingly, it is an object of one or more embodiments of the present invention to provide improved methods for rehabilitation, transformation, training, and learning for a person as a viewer which enables the viewer to experience a virtual session.

An additional object of one or more embodiments of the present invention is to provide a virtual session comprised of one or multiple virtual scenarios intended to activate the mirror neuron system.

An additional object of one or more embodiments of the present invention is to include within a virtual scenario one or multiple or any combination of suggestion(s), hypnotic induction(s), or hypnotic suggestion(s), that may possibly be applied to and/or utilized in relationship with one or multiple or any combination of characters and their motions, and objects, components, or aspects that comprise a virtual scenario intended to activate the mirror neuron system.

An additional object of one or more embodiments of the present invention is to possibly include within a virtual scenario a personalized virtual character, where said personalized virtual character is in the likeness of the viewer in that it has a virtual body of the same race and/or possibly similar characteristics and/or possibly similar proportions of the viewer, and has a virtual face and head that is developed using computer program techniques to create a virtual face and head to look specifically like the viewer.

An additional object of one or more embodiments of the present invention is to possibly include within a virtual scenario one or multiple or any combination of suggestion(s), hypnotic induction(s), hypnotic suggestion(s), or instruction(s), associated with said personalized virtual character.

An additional object of one or more embodiments of the present invention is to possibly include within a virtual scenario said personalized virtual character that is animated to properly perform one or multiple or any combination of acts, motions, and/or movements of the face and/or body.

An additional object of one or more embodiments of the present invention is to possibly include within a virtual scenario one or multiple or any combination of suggestion(s), hypnotic induction(s), hypnotic suggestion(s), or instruction(s), associated with said personalized virtual character that is animated to properly perform one or multiple or any combination of acts, motions, and/or movements of the face and/or body.

An additional object of one or more embodiments of the present invention is to possibly include within a virtual scenario said personalized virtual character that is animated with one or multiple or any combination of motion that is specific, smooth, coordinated, and/or accurately represent life-like movements of the face and/or body that may depict the successful achievement of prescribed goals and/or have defined programmed outcome(s).

An additional object of one or more embodiments of the present invention is to possibly include within a virtual scenario one or multiple or any combination of suggestion(s), hypnotic induction(s), hypnotic suggestion(s), or instruction(s), associated with said personalized virtual character that is animated with one or multiple or any combination of motion that is specific, smooth, coordinated, and/or accurately represent life-like movements of the face and/or body that may depict the successful achievement of prescribed goals and/or have defined programmed outcome(s).

An additional object of one or more embodiments of the present invention is to possibly include within a virtual scenario said personalized virtual character to be animated in one or multiple or any combination of speaking and/or be represented to speak and/or think and/or make sound and/or use the recorded and/or live voice of the viewer.

An additional object of one or more embodiments of the present invention is to possibly include within a virtual scenario one or multiple or any combination of suggestion(s), hypnotic induction(s), hypnotic suggestion(s), or instruction(s), associated with said personalized virtual character to be animated in one or multiple or any combination of speaking and/or be represented to speak and/or think and/or make sound and/or use the recorded and/or live voice of the viewer.

An additional object of one or more embodiments of the present invention is to possibly include within a virtual scenario said personalized virtual character expressing and/or performing one or multiple or any combination of suggestion(s), hypnotic induction(s), hypnotic suggestion(s), or instruction(s), and/or other verbal expression, including suggestions to the viewer to keep their eyes open, to close their eyes, or to open their eyes, as may be required in support of the intent and goal of the virtual scenario.

An additional object of one or more embodiments of the present invention is to possibly include within a virtual scenario virtual characters that are human and/or non-human that are associated directly and/or indirectly to said personalized virtual character.

An additional object of one or more embodiments of the present invention is to possibly include within a virtual scenario one or multiple or any combination of suggestion(s), hypnotic induction(s), hypnotic suggestion(s), or instructions, associated with virtual characters that are human and/or non-human that are associated directly and/or indirectly to said personalized virtual character.

An additional object of one or more embodiments of the present invention is to possibly include within a virtual scenario virtual characters that are human and/or non-human that are associated directly and/or indirectly to said personalized virtual character and are animated to properly perform one or multiple or any combination of acts, motions, and/or movements of the face and/or body.

An additional object of one or more embodiments of the present invention is to possibly include within a virtual scenario one or multiple or any combination of suggestion(s), hypnotic induction(s), hypnotic suggestion(s), or instruction, associated with virtual characters that are human and/or non-human that are associated directly and/or indirectly to said personalized virtual character and are animated to properly perform one or multiple or any combination of acts, motions, and/or movements of the face and/or body.

An additional object of one or more embodiments of the present invention is to possibly include within a virtual scenario virtual characters that are human and/or non-human that are associated directly and/or indirectly to said personalized virtual character and are animated with one or multiple or any combination of motion that is specific or smooth or coordinated or accurately represent life-like movements of the face and/or body that may depict the successful achievement of prescribed goals and/or have defined programmed outcome(s).

An additional object of one or more embodiments of the present invention is to possibly include within a virtual scenario one or multiple or any combination of suggestion(s), hypnotic induction(s), hypnotic suggestion(s), or instructions associated with virtual characters that are human and/or non-human that are associated directly and/or indirectly to said personalized virtual character and are animated with one or multiple or any combination of motion that is specific or smooth or coordinated or accurately represent life-like movements of the face and/or body that may depict the successful achievement of prescribed goals and/or have defined programmed outcome(s).

An additional object of one or more embodiments of the present invention is to possibly include within a virtual scenario virtual characters that are human and/or non-human that are associated directly and/or indirectly to said personalized virtual character and are animated in one or multiple or any combination of speaking and/or be represented to speak and/or think and/or make sound and/or use the recorded and/or live voice of the viewer.

An additional object of one or more embodiments of the present invention is to possibly include within a virtual scenario one or multiple or any combination of suggestion(s), hypnotic induction(s), hypnotic suggestion(s), or instructions, associated with virtual characters that are human and/or non-human that are associated directly and/or indirectly to said personalized virtual character and are animated in one or multiple or any combination of speaking and/or be represented to speak and/or think and/or make sound and/or use the recorded and/or live voice of the viewer.

An additional object of one or more embodiments of the present invention is to possibly include within a virtual scenario virtual characters that are human and/or non-human that are associated directly and/or indirectly to said personalized virtual character and express and/or perform and/or follow one or multiple or any combination of hypnotic induction(s), hypnotic guided visualization(s), suggestion(s), or hypnotic suggestion(s), or other verbal expression.

An additional object of one or more embodiments of the present invention is to possibly include within a virtual scenario virtual characters that are human and/or non-human.

An additional object of one or more embodiments of the present invention is to possibly include within a virtual scenario one or multiple or any combination of suggestion(s), hypnotic induction(s), hypnotic suggestion(s), or instructions, associated with virtual characters that are human and/or non-human.

An additional object of one or more embodiments of the present invention is to possibly include within a virtual scenario virtual characters that are human and/or non-human and are animated to properly perform one or multiple or any combination of acts, motions, and/or movements of the face and/or body.

An additional object of one or more embodiments of the present invention is to possibly include within a virtual scenario one or multiple or any combination of suggestion(s), hypnotic induction(s), hypnotic suggestion(s), or instruction, associated with virtual characters that are human and/or non-human and are animated to properly perform one or multiple or any combination of acts, motions, and/or movements of the face and/or body.

An additional object of one or more embodiments of the present invention is to possibly include within a virtual scenario virtual characters that are human and/or non-human and are animated with one or multiple or any combination of motion that is specific or smooth or coordinated or accurately represent life-like movements of the face and/or body that may depict the successful achievement of prescribed goals and/or have defined programmed outcome(s).

An additional object of one or more embodiments of the present invention is to possibly include within a virtual scenario one or multiple or any combination of suggestion(s), hypnotic induction(s), hypnotic suggestion(s), or instructions associated with virtual characters that are human and/or non-human and are animated with one or multiple or any combination of motion that is specific or smooth or coordinated or accurately represent life-like movements of the face and/or body that may depict the successful achievement of prescribed goals and/or have defined programmed outcome(s).

An additional object of one or more embodiments of the present invention is to possibly include within a virtual scenario virtual characters that are human and/or non-human and are animated in one or multiple or any combination of speaking and/or be represented to speak and/or think and/or make sound and/or use the recorded and/or live voice of the viewer.

An additional object of one or more embodiments of the present invention is to possibly include within a virtual scenario one or multiple or any combination of suggestion(s), hypnotic induction(s), hypnotic suggestion (s), or instructions, associated with virtual characters that are human and/or non-human and are animated in one or multiple or any combination of speaking and/or be represented to speak and/or think and/or make sound and/or use the recorded and/or live voice of the viewer.

An additional object of one or more embodiments of the present invention is to possibly include within a virtual scenario virtual characters that are human and/or non-human and express and/or perform and/or follow one or multiple or any combination of hypnotic induction(s), hypnotic guided visualization(s), suggestion(s), or hypnotic suggestion(s), or other verbal expression.

An additional object of one or more embodiments of the present invention is to possibly include within a virtual scenario other audio, including narrative-based and/or any virtual character(s) expression of one or multiple or any combination of verbal suggestion(s), guidance, instruction(s), hypnotic suggestion(s), hypnotic guidance, or hypnotic instruction(s), verbal expression, music, sounds, or the like.

An additional object of one or more embodiments of the present invention is to possibly include within a virtual scenario one or multiple or any combination of perspectives or points of view of the content or aspects of a virtual scenario, including first person and/or third person perspectives of said personalized virtual character and/or of any virtual character.

An additional object of one or more embodiments of the present invention is to possibly include within a virtual scenario one or multiple or any combination of suggestion(s), hypnotic induction(s), or hypnotic suggestion(s), associated with one or multiple or any combination of perspectives or points of view of the content or aspects of a virtual scenario, including first person and/or third person perspectives of said personalized virtual character and/or of any virtual character.

An additional object of one or more embodiments of the present invention is to possibly include within a virtual scenario one or multiple or any combination of virtual environments or settings or locations or weather.

An additional object of one or more embodiments of the present invention is to possibly include within a virtual scenario one or multiple or any combination of suggestion(s), hypnotic induction(s), or hypnotic suggestion(s), associated with one or multiple or any combination of virtual environments or settings or locations or weather.

An additional object of one or more embodiments of the present invention is to possibly include within a virtual scenario one or more special effects.

An additional object of one or more embodiments of the present invention is to possibly include within a virtual scenario one or multiple or any combination of suggestion(s), hypnotic induction(s), or hypnotic suggestion(s), associated with one or more special effects.

An additional object of one or more embodiments of the present invention is to possibly include a user's interactive input of motion and/or activity into a virtual scenario which acts upon and/or animates said personalized virtual character, and/or virtual character not made in the likeness of the virtual user but are associated directly and/or indirectly to said personalized virtual character, and/or virtual character not made in the likeness of the virtual user, and/or any object or component of or within the virtual scenario, where any activity or motion the user inputs is translated into one or multiple or any combination of activity or motion that is smooth and/or pre-directed and/or pre-defined, regardless of the quality, smoothness, range of motion, speed, direction, or other attributes of the user's interactive input of motion and/or activity.

An additional object of one or more embodiments of the present invention is to possibly include within a virtual scenario data collection that provides for the recording and analyzing of viewer performance data, including but not limited to response(s) to suggestion(s), hypnotic induction(s), hypnotic suggestion(s), interactivity, attentiveness, performance assessment, vigilance latency, and similar.

An additional object of one or more embodiments of the present invention is to possibly include within a virtual scenario one or multiple or any combination of suggestion(s), hypnotic induction(s), or hypnotic suggestion(s), associated with data collection that provides for the recording and analyzing of viewer performance data, including but not limited to response(s) to suggestion(s), hypnotic induction(s), hypnotic suggestion(s), interactivity, attentiveness, performance assessment, vigilance latency, and similar.

An additional object of one or more embodiments of the present invention is to allow the viewer see said personalized virtual character or a virtual character not made in the likeness of the viewer perform one of many types of induction and/or guided visualizations viewed through technologies including video, virtual reality, augmented reality, or holography, either individually or collectively in various forms, displayed in 2D, 2D stereo, 3D, or 3D stereo.

An additional object of one or more embodiments of the present invention is to allow the viewer to see said personalized virtual character or a virtual character not made in the likeness of the viewer perform one of many types of induction and/or guided visualizations viewed through immersive and/or non-immersive techniques involving the use of a computer or smartphone or the like using a head mounted display, or with 3D glasses to view the screen directly if the computer or smartphone or the like were to be displaying the content in 3D stereo.

An additional object of one or more embodiments of the present invention is to possibly include a hypnotic induction and/or hypnotic suggestion where the viewer sees said personalized virtual character or a virtual character not made in the likeness of the viewer perform one of many types of induction and/or guided visualizations while the viewer experiences forms of sensory deprivation and/or forms of sensory stimulation, sound and light stimulation, sound stimulation, light stimulation, olfactory cues, visceral stimulation, CES, (Cranial Electrotherapy Stimulation), or biofeedback.

An additional object of one or more embodiments of the present invention is to allow the viewer to experience the virtual scenario through playback and possibly either interactively, actively, or passively.

An additional object of one or more embodiments of the present invention is to facilitate rehabilitation, transformation, training, and learning of a person through experiencing the virtual scenario alone, aiding the person as a viewer to achieve the objectives and goals of the virtual session.

An additional object of one or more embodiments of the present invention is to facilitate rehabilitation, transformation, training, and learning of a person as a viewer through experiencing the virtual scenario with assistance from one or more individuals for the purpose of aiding the viewer to achieve the objectives and goals of the virtual session.

BRIEF DESCRIPTION OF THE DRAWINGS

FIG. 1 illustrates an example of a virtual environment including a virtual character with a body and no head from which the virtual scenario is made;

FIGS. 2 A and B are side and front photographs of a person;

DETAILED DESCRIPTION OF THE PREFERRED EMBODIMENT

Figure 3:
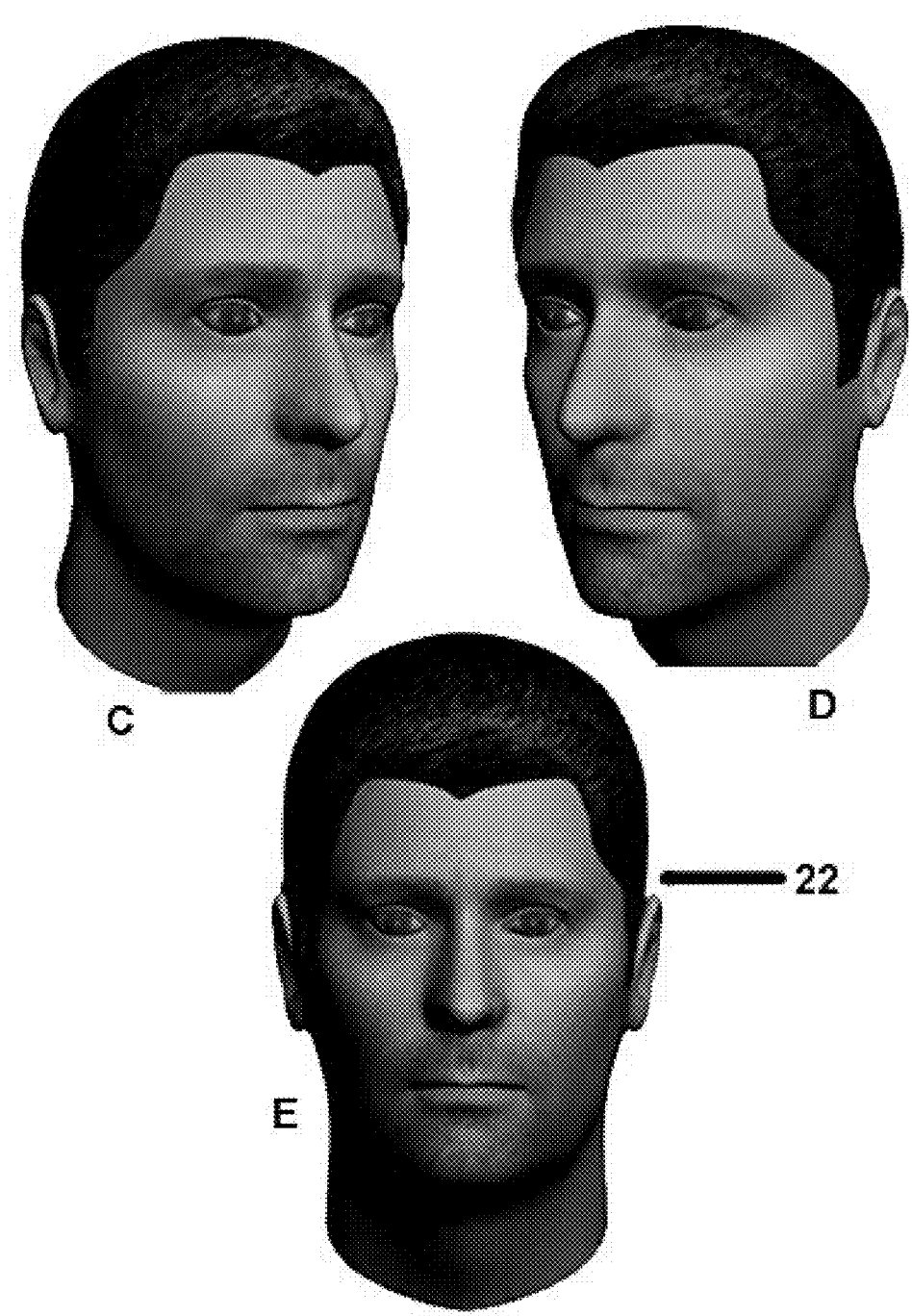
FIG. 3 shows a front (E), left oblique (D), and right oblique (C) view of a computer generated head derived from the photos of FIG. 2.
Figure 4:
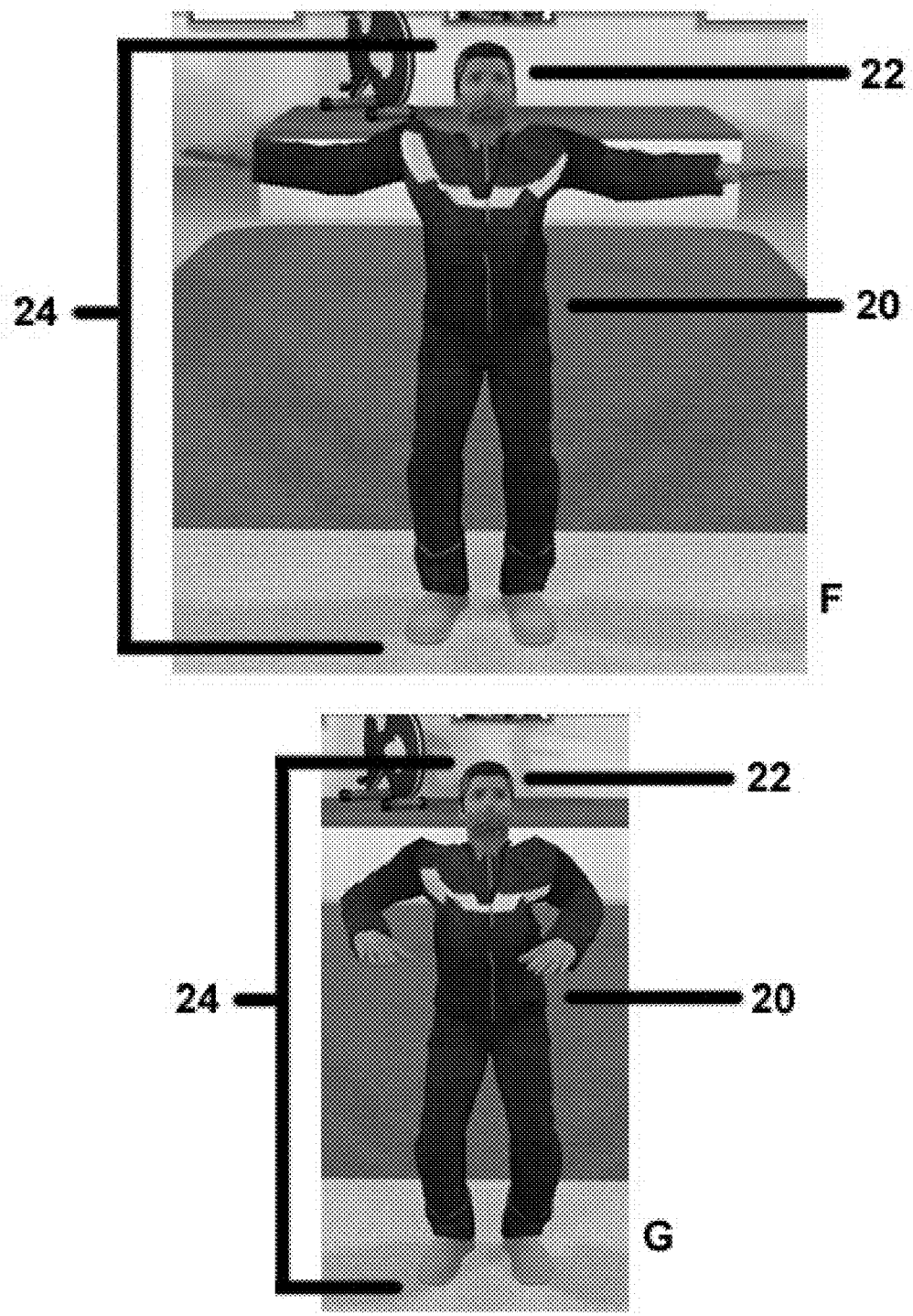
FIGS. 4 F and G shows the virtual character with head of FIG. 3 and body of FIG. 1 in different states of animated motion.

In that form of the present invention described above and chosen for purposes of illustration, the present invention provides improved methods for rehabilitation, transformation, training, and learning for a person as a viewer which enables the viewer to experience a virtual session comprised of one or more virtual scenarios, an example of which is seen in FIG. 4 that shows a virtual character 24 comprised of virtual character head 22 of FIG. 3 attached to virtual character body 20 of FIG. 1, with said virtual character 24 in two positions achieved through the animation assigned, which is animated using any desired animation technique, such as motion capture or frame-by-frame, to said virtual character 24, seeing said virtual character 24 from a third person perspective and a front point of view. A specific component of the present invention is to include within a virtual scenario one or multiple or any combination of suggestion(s), hypnosis, hypnotic induction(s), or hypnotic suggestion(s), in one or multiple or any combination of verbal, audio, or visual form that may possibly be applied to and/or utilized in relationship with one or multiple or any combination of the characters, objects, components, or aspects that comprise a virtual session. An illustration of this can be seen using FIG. 5 that shows said virtual character 24 in several positions, such as in a position viewed during a hypnotic induction as illustrated in H, while in most examples of FIG. 5 showing the performance of different actions or motions seen in I, J, K, L, and M, from the third person perspective and several points of view, including front, side, oblique, and top points of views, whereby verbal suggestion(s) and/or hypnotic suggestion(s) are presented to the viewer either in a direct or inferred manner or other form to facilitate and enhance the effects of the virtual scenario such as to impress upon the viewer that the motion is smooth, complete, effortless, and strong, and that the viewer see their virtual character as being calm, relaxed, and confident and that they too embody these same conditions.

Figure 6:
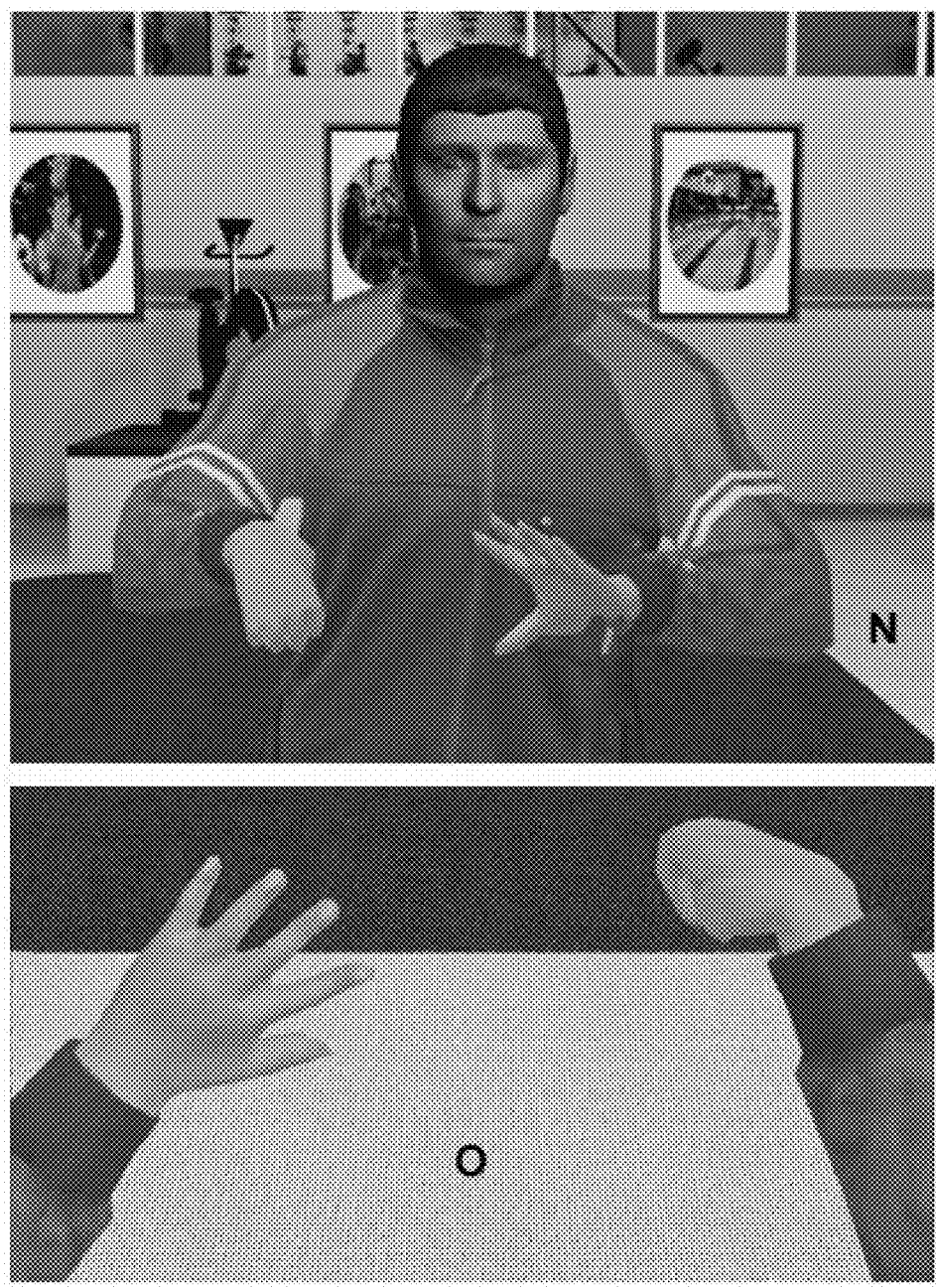
FIG. 6 N is a front view of the virtual character performing wrist motion from a third person perspective, where 0 shows the wrist motion from a first person perspective as would be seen through the eyes of the virtual character, and shows that both animations could simultaneously be presented to the viewer as depicted here to present to the viewer two perspectives, both third person and first person, at the same time.

A specific intention of the present invention is to provide a virtual session comprised of one or more virtual scenarios intended to activate the mirror neuron system. This is facilitated by presenting the viewer with a virtual character performing specific motion, as illustrated in FIG. 6. The activation of the mirror neuron system is further enhanced when a virtual character is created to be in the likeness of the viewer, specifically having a virtual head in the likeness of the viewer and having a virtual body of the same race and similar proportions and similar characteristics of the viewer. For example, FIG. 1 shows an example of a virtual scenario, within which is a virtual character body indicated generally at 20 that is currently without a head but to which a head will be attached, where in this example the virtual body being selected from a library of virtual bodies is one of the same race and similar proportions and characteristics of the viewer. In this example where the head to be attached to a virtual character body 20 of FIG. 1 is intended to look like the viewer for which the virtual scenario is made, FIG. 2 presents one step in one possible process of developing a virtual character head in the likeness of said viewer. This is accomplished by taking a side view and/or front view photograph(s) of said viewer indicated at A and/or B respectively which are then used in a development process involving a computer program that uses the photograph(s) A and/or B of said viewer to create a virtual head in the likeness of said viewer. FIG. 3 shows 3 views, a front view E, a left oblique view D, and right oblique view C, of a virtual character head 22 generated by said computer program that created a virtual character head based upon photograph(s) A and/or B of FIG. 2 of said person, which can then be attached to said virtual character body 20 of FIG. 1. This virtual character head in the likeness of the viewer is then attached to said virtual body of the same race and similar proportions and similar characteristics of the viewer. Further, anyone or multiple or any combination of suggestion(s), hypnotic induction(s), or hypnotic suggestion(s) can be presented to the viewer that will be associated with said virtual character created to be in the likeness of the viewer to enhance focus and acceptance from the viewer of the virtual character and the motions, actions, verbalizations etc. performed by said virtual character as indicated previously. Thus, a viewer sees what appears to be his or her self-performing the desired action. In this way, the viewer sees the action as though he or she were performing it his or her self.

Figure 5:
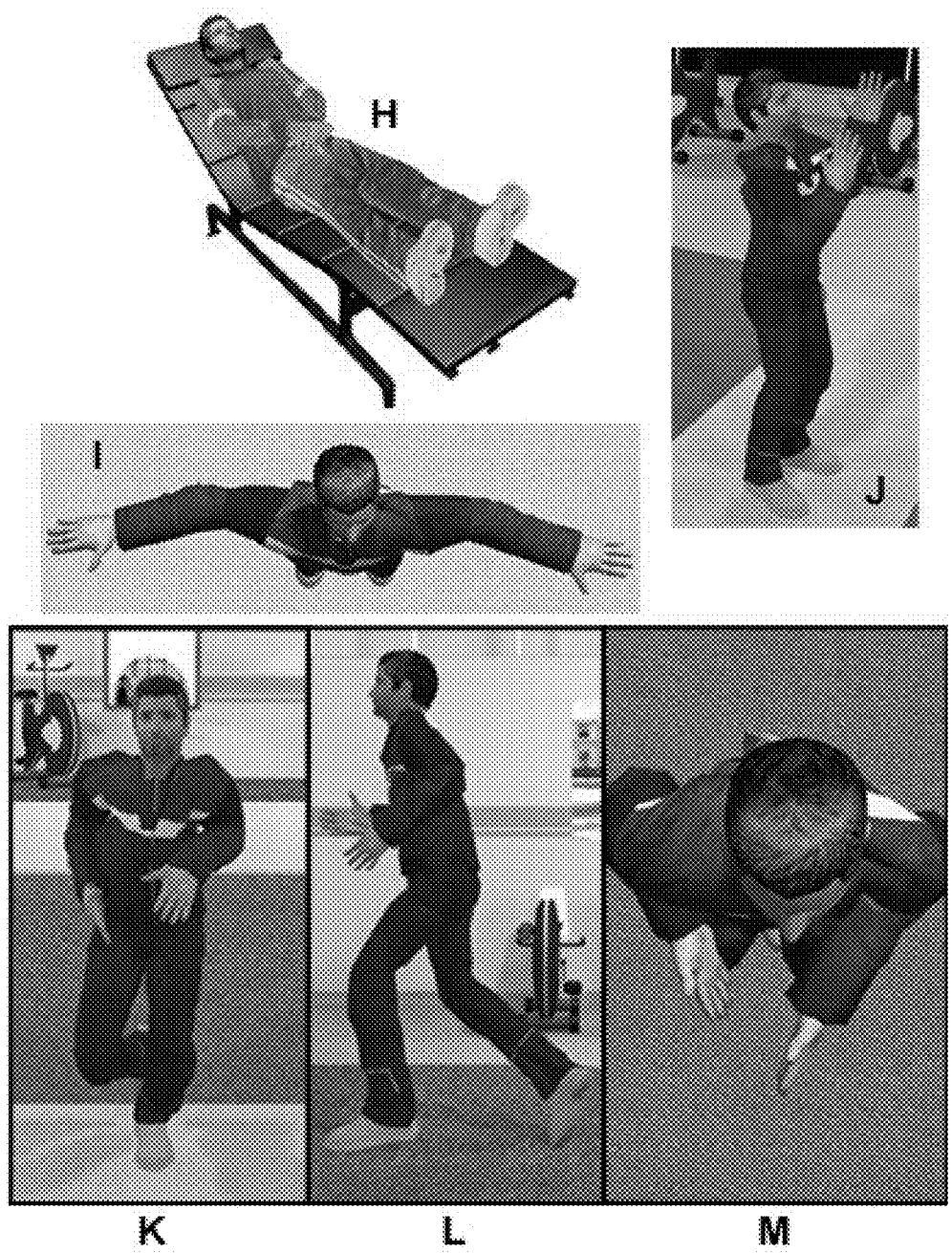
FIG. 5 H, I, J, K, L, M shows the virtual character in different states of animated motion and representation, from a third person perspective and several points of view.

A viewer's virtual character created to be in the likeness of the viewer is animated to properly perform one or multiple or any combination of acts or motions or movements that are specific or smooth or coordinated or accurately represent life-like movements that may depict the successful achievement of prescribed goals and/or have defined programmed outcome(s), such as what is presented to the viewer and supported through effortless, health-giving exercise motion depicted in FIG. 5, coupled with one or multiple or any combination of suggestion(s), hypnotic induction(s), or hypnotic suggestion(s), associated with the animation of the virtual character created to be in the likeness of the viewer and be presented to the viewer as the action takes place, focusing on empowering the vision of the motion and presenting aspects of the virtual character in a positive, reinforcing expression. To further optimize and enhance the activation of the viewer's mirror neuron system, said acts or motions or movements may be such that the viewer sees their virtual character created to be in the likeness of the viewer get something for themselves that they like and go through the motions to achieve that goal, such as to open a kitchen cabinet door, take out a tea cup and place it on a kitchen counter, place a tea bag into the cup, pour hot water into the cup, add sugar to the tea, stir the tea in the cup, and take a sip of the tea. If the viewer has a favorite cup they actually use on a daily basis for tea or coffee, that cup can be modeled and textured an imported into the virtual scenario, making the virtual scenario that much more personalized. In terms of applying the same idea to personalized motion, if the viewer for example was or had been a baton twirler or violin player, the virtual character created to be in the likeness of the viewer can be animated to perform motion and action related to baton twirling or violin playing, adding to the virtual scenario a component that calls to the particular memory and capability of the viewer, which may further enhance the excitability and activity of their mirror neuron system.

To enhance and empower the experience of the virtual scenario, a virtual character made in the likeness of the viewer can be animated in one or multiple or any combination of speaking or otherwise be represented to speak or think or make sound and may use the recorded or live voice of the viewer. Further, the virtual character made in the likeness of the viewer can express and/or perform one or multiple or any combination of hypnotic induction(s), hypnotic guided visualization(s), or express and/or perform one or multiple or any combination of suggestion(s) or hypnotic suggestion(s), or other verbal expression, including suggestions to the viewer to keep their eyes open, to close their eyes, or to open their eyes, in a prescribed order. An example of this can be applied to one having experienced a stroke resulting in impaired upper limb mobility, where there would be a virtual character made in the likeness of the stroke victim, where the stroke victim is now the viewer of a virtual session designed for rehabilitation of the upper impaired limb of the viewer, where the viewer is viewing a virtual scenario that for this example is developed as in FIGS. 6N and O, where the virtual character is made in the likeness of the viewer and where the mouth and face of said virtual character is animated to express verbally in the voice of the viewer either from a recording and/or live spoken into a microphone and output to headphones used by the viewer, speaking suggestions directed to the viewer, where the suggestions can be spoken in the first person, that reinforce the sense that the wrist, hand, and finger motion is being performed smoothly, effortlessly, completely, and with power, which could include for example one or more or all of the following types of suggestions, such as "I move my wrists, hands, and fingers effortlessly and perform the motion completely and powerfully, and I feel good that I am being healed" or "It makes me feel good when I move my wrists, hands, and fingers more freely and with more power" or "My confidence grows as I see myself effortlessly and powerfully move my wrists, hands, and fingers" or variations on those themes.

Additional virtual characters that are human and/or non-human can be included in virtual scenarios where said virtual characters are associated to the virtual character created to be in the likeness of the viewer. One or more of these human virtual characters could have a virtual body of the same race and similar proportions of the viewer, or could be relatives or friends of the viewer that have virtual characters made in their likeness, where they could all interact together using one or multiple or any combination of acts or motions or movements that may depict the successful achievement of prescribed goals and/or have defined programmed outcome(s) achieved through specific, smooth, coordinated motion accurately representing lifelike movements. Any and all virtual characters in this type of virtual scenario can express one or multiple or any combination of dialog or speaking or otherwise be represented to speak or think or make sound. In this type of virtual scenario, as in others, one or multiple or any combination of suggestion(s), hypnotic induction(s), or hypnotic suggestion(s), or the like can be applied to the individual virtual characters, the associated character motion, objects in the virtual environment, and/or the individual and/or collective goals and objectives of the virtual characters. Further, any and all virtual characters in this type of virtual scenario can express and/or perform one or multiple or any combination of hypnotic induction(s), hypnotic guided visualization(s), or express and/or perform one or multiple or any combination of suggestion(s) or hypnotic suggestion(s), or other verbal expression, which could be expressed in the first person in the case of the virtual character made in the likeness of the viewer, including suggestions to the viewer to keep their eyes open, to close their eyes, or to open their eyes, in a prescribed order. An example of this type of virtual scenario could be in the case where an autistic child has a virtual session made for him or her, where the included virtual scenario(s) has a virtual character made in the likeness of the autistic child, as well as including additional virtual characters individually made in the likeness of family and perhaps friends and perhaps a favorite pet of the autistic child.

The above details and examples can also be applied to virtual sessions that include virtual scenarios that do not have any virtual character made in the likeness of the viewer and that may have one or multiple virtual characters that are human and/or non-human, although the above details and examples need to be tailored appropriately to accommodate these types of virtual scenarios. For example, in this type of virtual scenario, one or more human virtual characters may a virtual body of the same race and similar proportions of the viewer, one or more human and/or non-human virtual characters will properly perform one or multiple or any combination of acts or motions or movements of one or multiple or any combination of motion that is specific or smooth or coordinated or accurately represent life-like movements that may depict the successful achievement of prescribed goals and/or have defined programmed outcome(s), where the virtual characters express one or multiple or any combination of dialog or speaking or otherwise be represented to speak or think or make sound, where one or multiple or any combination of suggestion(s), hypnotic induction(s), or hypnotic suggestion(s), or the like can be applied to the individual virtual characters, the associated character motion, and/or the individual and/or collective goals and objectives of the virtual characters. Further, any and all virtual characters in this type of virtual scenario can express and/or perform one or multiple or any combination of hypnotic induction(s), hypnotic guided visualization(s), or express and/or perform one or multiple or any combination of suggestion(s) or hypnotic suggestion(s), or other verbal expression, including suggestions to the viewer to keep their eyes open, to close their eyes, or to open their eyes, in a prescribed order.

Any virtual scenario could include one or multiple or any combination of perspectives or points of view of the content of a virtual scenario, including first person through the perspective of a virtual character as if looking through the eyes of a virtual character as in 0 of FIG. 6, as applied to a virtual character created to be in the likeness of the viewer or a virtual human character(s) not made in the likeness of the viewer which may or may not be relating to the virtual character made in the likeness of the viewer, where it is further possible to present two perspectives of both third person and first person at the same time as in FIG. 6 where both animations could simultaneously be presented to the viewer, and/or include a first person perspective to an additional non-human virtual character(s) which may or may not be relating to the virtual character made in the likeness of the viewer, or perspectives or points of view of any aspect of the virtual environment and the content within it. One or multiple or any combination of suggestion(s), hypnotic induction(s), or hypnotic suggestion(s), or the like can be applied as previously described.

Any virtual scenario could include one or multiple or any combination of virtual environments or settings or locations or weather, special effects, data collection that provides for the recording and analyzing of viewer performance data of many types, including interactivity, attentiveness, duration/level of completion of the virtual session, date and time stamp, performance assessment, vigilance latency, and similar. One or multiple or any combination of suggestion(s), hypnotic induction(s), or hypnotic suggestion(s), or the like can be applied as previously described.

Any virtual scenario could include the viewer's interactive input of motion or activity into a virtual scenario which acts upon and/or animates a virtual character made in the likeness of the user, and/or a virtual character not made in the likeness of the virtual user but that relates to the virtual user in the virtual scenario, and/or a virtual character not made in the likeness of the virtual user, or any object or component of or within the virtual environment, where any motion or activity the viewer inputs is translated into one or multiple or any combination of motion that is smooth or pre-directed or pre-defined, regardless of the quality or smoothness or range of motion of the user's actual physical movement. One or multiple or any combination of suggestion(s), hypnotic induction(s), or hypnotic suggestion(s), or the like can be applied as previously described.

Any virtual scenario could include other audio, including narrative-based and/or any virtual character(s) expression of one or multiple or any combination of verbal suggestion(s), guidance, instruction(s), hypnotic suggestion(s), hypnotic guidance, or hypnotic instruction(s), verbal expression, music, sounds, or the like which can be applied to or associated with a virtual character made in the likeness of the user, and/or a virtual character not made in the likeness of the virtual user but that relates to the virtual user in the virtual scenario, and/or a virtual character not made in the likeness of the virtual user, or any object or component of or within the virtual environment, applied to or associated with the associated character or object motion, and/or the individual and/or collective goals and objectives of the virtual characters, applied to or associated or one or multiple or any combination of perspectives and/or points of view, virtual environments or settings or locations or weather, one or more special effects, activities of virtual characters and content of a virtual scenario related to data collection that provides for the recording and analyzing of viewer performance data of many types, including interactivity, attentiveness, duration/level of completion of the virtual session, date and time stamp, performance assessment, vigilance latency, and similar.

The viewer can see either a virtual character created to be in the likeness of the viewer or a virtual character not made in the likeness of the viewer or any additional virtual character perform one of many types of induction and/or guided visualizations viewed possibly through technologies including video, virtual reality, augmented reality, or holography, either individually or collectively in various forms, displayed in 2D, 2D stereo, 3D, or 3D stereo. This example of a virtual scenario may be developed to be interactively engaged within a virtual reality environment or be recorded onto recording media for playback, to be experienced by the person as a Viewer. Some examples of possible recording media are DVD, CD, flash memory, or hard drive.

The viewer can see either a virtual character created to be in the likeness of the viewer or a virtual character not made in the likeness of the viewer or any additional virtual character perform one of many types of induction and/or guided visualizations viewed through immersive and/or non-immersive techniques involving the use of a computer or smartphone or the like, using a head mounted display or with 3D glasses to view the screen directly if the computer or smartphone or the like were to be displaying the content in 3D stereo.

Hypnotic induction and/or hypnotic suggestion is applied to the viewer where the viewer sees either a virtual character created to be in the likeness of the viewer or a virtual character not made in the likeness of the viewer or any additional virtual character perform one of many types of induction and/or guided visualizations while the viewer experiences forms of sensory deprivation and/or forms of sensory stimulation, sound and light stimulation, sound stimulation, light stimulation, olfactory cues, visceral stimulation, CES, (Cranial Electrotherapy Stimulation), or biofeedback.

The viewer can experience the virtual session and the virtual scenarios that it is comprised of through playback and possibly either interactively, actively, or passively, and either alone or with assistance for rehabilitation, transformation, training, and learning, aiding the viewer to achieve the goals of the virtual session.

REFERENCES

1. Hull, C. L. (1933/2002). "Hypnosis and suggestibility: an experimental approach," Crown House Publishing.
2. Kirsch, L., Braffman, W. (2001). "Imaginative suggestibility and hypnotizability," Current Directions in Psychological Science. 4 (2): 57-61.
3. Heap, M. (1996). "The nature of hypnosis." The Psychologist. 9 (11): 498-501.
4. Page, S. J., et al., *Mental practice combined with physical practice for upper-limb motor deficit insubacute stroke*, Phys Ther, 2001. 81(8): p. 1455-62.
5. Ertelt, D., et al., *Action observation has a positive impact on rehabilitation of motor deficits after stroke*, Neuroimage, 2007.36 Suppl 2: p. T164-73.
6. Fadiga, L., L. Craighero, and E. Olivier, *Human motor cortex excitability during the perception of others' action*, Curr Opin Neurobiol, 2005. 15(2): p. 213-8.
7. Pomeroy, V. M., et al., *The potential for utilizing the "mirror neurone system" to enhance recovery of the severely affected upper limb early after stroke: a review and hypothesis*, Neurorehabil Neural Repair, 2005. 19(1): p. 4-13.
8. Iacoboni, M., et al., *Grasping the intentions of others with one's own mirror neuron system*, PLoS Biol, 2005. 3(3): p. e79.
9. Eng, K., et al., *Interactive visuo-motor therapy system for stroke rehabilitation*, Med Biol Eng Comput, 2007. 45(9): p. 901-7.
10. Buccino, G., A. Solodkin, and S. L. Small, *Functions of the mirror neuron system: implications for neurorehabilitation*, Cogn Behav Neurol, 2006. 19(1): p. 55-63.
11. Obermana, L., V. Ramachandran, and 1. Pineda, *Modulation of mu suppression in children with autism spectrum disorders in response to familiar or unfamiliar stimuli: the mirror neuron hypothesis*, Neuropsychologia, 2008. 46: p. 1558-1565.
12. Rizzolatti, G. and L. Fadiga, *Grasping objects and grasping action meanings: the dual role of monkey rostroventral premotor cortex (area FS). Novartis Found Symp*, 1998.218: p. 81-95; discussion 95-103.
13. Arbib, M. A., et al., *Synthetic brain imaging: grasping, mirror neurons and imitation*, Neural Netw, 2000, 13(8-9): p. 975-97.
14. Oztop, E., M. Kawato, and M. Arbib, *Mirror neurons and imitation: a computationally guided review*, Neural Netw, 2006. 19(3): p. 254-71.
15. Fadiga, L., Fogassi L., Pavesi G., Rizzolatti G., *Motor facilitation during action observation: a magnetic stimulation study*, J. Neurophysiology, 1995. 73(6): p. 2608-2611).
16. Avenanti, A., Bolognini N., Maravita A., Aglioti S. M., *Somatic and motor components of action simulation*, Curr Biol, 2007. 17(24): p. 2129-3135.

17. Heiser, M., Iacoboni M., Maeda F., Marcus J., Mazziotta J. C., *The essential role of Broca's area in imitation*, European J of Neuroscience, 2003. 17(5): p. 1123-1128.
18. Tai, Y. F., et al., *The human premotor cortex is 'mirror' only for biological actions*, Curr Biol, 2004. 14(2): p. 117-20.
19. Iacoboni, M., et al., *Cortical mechanisms of human imitation*, Science, 1999. 286(5449): p. 2526-8.
20. Celnik, P., et al., *Effects of action observation on physical training after stroke*, Stroke, 2008. 39(6): p. 1814-20.
21. McCloy, R. and R. Stone, Science, medicine, and the future: *Virtual reality in surgery*, 2001 p. 912-915.
22. Ungs, T. J., *Simulator induced syndrome: evidence for long-term aftereffects*, Aviat Space Environ Med, 1989. 60(3): p. 252-5.
23. Rizzo, A., et al., *Development of a VR therapy application for Iraq war military personnel with PTSD*, Stud Health Technol Inform, 2005. 111: p. 407-13.
24. Merians, A. S., et al., *Virtual reality-augmented rehabilitation for patients following stroke*, Phys Ther, 2002. 82(9): p. 898-915.
25. Stewart, J. C., et al., *Intervention to enhance skilled arm and hand movements after stroke: A feasibility study using a new virtual reality system*, J Neuroeng Rehabil, 2007. 4: p. 21.
26. Winstein, C. and J. Stewart, *Conditions of task practice for individuals with neurologic impairments*, in Textbook of Neural Repair and Rehabilitation, M. Selzer, et al., Editors. 2006, Cambridge University Press: New York. p. 89-102.
27. Wolf, S., et al., *Repetitive task practice: a critical review of constraint-induced movement therapy in stroke*. neurologist, 2002. 8(6): p. 325-338.
28. Baram, Y. and A. Miller, *Virtual reality cues for improvement of gait in patients with multiple sclerosis*, Neurology, 2006. 66(2): p. 178-81.
29. Fulk, G. D., *Locomotor training and virtual reality-based balance training for an individual with multiple sclerosis: a case report*, J Neurol Phys Ther, 2005. 29(1): p. 34-42.
30. Fung, J., et al., *Locomotor rehabilitation in a complex virtual environment*, Conf Proc IEEE Eng Med Biol Soc, 2004.7: p. 4859-61.
31. Fung, J., et al., *A treadmill and motion coupled virtual reality system for gait training post-stroke*, Cyberpsychol Behav, 2006. 9(2): p. 157-62.
32. Kuttuva, M., et al., *The Rutgers Arm, a rehabilitation system in virtual reality: a pilot study*, Cyberpsychol Behav, 2006. 9(2): p. 148-51.
33. Tobis, M. J. and B. Azarbal, *Does patent foramen ovale promote cryptogenic stroke and migraine headache?* Tex Heart Inst J, 2005. 32(3): p. 362-5.
34. Rizzo A., et al., *Analysis of Assets for Virtual Reality Applications in Neuropsychology*, Neuropsychological Rehabilitation, 2004. 14(1/2): p. 207-239.
35. Malouin, F., et al., *Working memory and mental practice outcomes after stroke*, Arch Phys Med Rehabil, 2004. 85(2): p. 177-83.
36. Sterner, R. T. and L. Carpp, *Psychomotor rehearsal: enhancement of rotary-pursuit tracking using a massed-training procedure*, Percept Mot Skills, 1977. 44(1): p. 243-8.
37. Lotze, M., et al., *Activation of cortical and cerebellar motor areas during executed and imagined hand movements: an fMRI study*, 1 Cogn Neurosci, 1999. 11(5): p. 491-501.
38. Warner, L. and M. E. McNeill, *Mental imagery and its potential for physical therapy*, Phys Ther, 1988, 68(4): p. 516-21.
39. Stevens, J. A. and M. E. Stoykov, *Simulation of bilateral movement training through mirror reflection: a case report demonstrating an occupational therapy technique for hemiparesis*, Top Stroke Rehabil, 2004. 11(1): p. 59-66.
40. Stevens, J. A. and M. E. Stoykov, *Using motor imagery in the rehabilitation of hemiparesis*, Arch Phys Med Rehabil, 2003. 84(7): p. 1090-2.
41. Page, S. J., et al., *A randomized efficacy and feasibility study of imagery in acute stroke*, Clin Rehabil, 2001. 15(3): p. 233-40.
42. Jackson, P. L., et al., *Functional cerebral reorganization following motor sequence learning through mental practice with motor imagery*, Neuroimage, 2003. 20(2): p. 1171-80.
43. Malouin, F., et al., *Brain activations during motor imagery of locomotor-related tasks: a PET study*, Hum Brain Mapp, 2003. 19(1): p. 47-62.

What is claimed is:

1. A method for rehabilitating a user, comprising:
displaying a virtual scenario to a user using a screen or a head-mounted display, wherein the virtual scenario is designed for stroke rehabilitation of the user, wherein the virtual scenario comprises a virtual character performing at least one physical action, wherein the virtual character is a likeness of the user, and wherein the at least one physical action is smooth, coordinated, and representative of life-like movements depicting successful achievement of prescribed goals;
playing at least one verbal hypnotic suggestion to the user using an audio component; and
displaying at least one non-verbal hypnotic suggestion to the user using at least the screen or the head-mounted display, wherein the at least one non-verbal hypnotic suggestion comprises virtual visualization, wherein a combination of displaying the virtual scenario, the at least one verbal hypnotic suggestion, and the at least one non-verbal hypnotic suggestion instructs the user to imitate the at least one physical action, and wherein the imitation of the at least one physical action by the user is translated into smooth, pre-directed motion to the virtual character regardless of a quality of the imitation.

2. The method of claim 1, wherein the at least one physical action comprises a task-oriented motion.

3. The method of claim 2, wherein the task-oriented motion comprises movement of upper limbs of the user or movement of lower limbs of the user, wherein the movement of the upper limbs comprises one or more of a shoulder range-of-motion (ROM) task, an elbow ROM task, a wrist ROM task, and a finger ROM task.

4. The method of claim 1, further comprising:
collecting data using a computer, wherein at least one data collection device is provided for collecting the data related to at least one of attentiveness, level of completion, performance assessment values, and vigilance latency of the user.

5. The method of claim 1, wherein the virtual scenario comprises at least one of one or more additional virtual characters, props, and scene elements, and wherein each of the one or more additional virtual characters is human or non-human.

6. The method of claim 5, wherein the user interacts with at least one of the one or more additional virtual characters, props, and scene elements, and wherein the interaction reinforces the intent to imitate the at least one physical action.

7. The method of claim 1, wherein exposing the user to the virtual scenario comprises using one or more technologies including virtual reality, augmented reality, and holography, and wherein displaying the virtual scenario comprises using at least one of a 2D display, a 2D stereo display, a 3D display, and a 3D stereo display.

8. The method of claim 1, further comprising:
imparting forms of hypnotic induction, wherein the forms of hypnotic induction include at least one of sensory deprivation, sensory stimulation, sound stimulation, light stimulation, olfactory cues, visceral stimulation, cranial electrotherapy stimulation, and biofeedback.

9. A system for rehabilitating a user, comprising:
a computer configured to render a virtual scenario;
a display component comprising at least one of a screen or a head-mounted display; and
an audio component,
wherein the virtual scenario is configured for stroke rehabilitation of the user,
wherein the display component is configured to display a virtual character in the virtual scenario performing at least one physical action,
wherein the virtual character is a likeness of the user,
wherein the at least one physical action is smooth, coordinated, and representative of life-like movements depicting successful achievement of prescribed goals,
wherein the audio component is configured to provide the user with at least one verbal hypnotic suggestion,
wherein at least one of the audio component and the display component is configured to provide the user with at least one non-verbal hypnotic suggestion,
wherein the at least one non-verbal hypnotic suggestion comprises virtual visualization, and
wherein a combination of displaying the virtual scenario, the at least one verbal hypnotic suggestion, and the at least one non-verbal hypnotic suggestion instructs the user to imitate the at least one physical action, and wherein the imitation of the at least one physical action by the user is translated into smooth, pre-directed motion to the virtual character regardless of a quality of the imitation.

10. The system of claim 9, wherein the at least one physical action comprises a task-oriented motion.

11. The system of claim 10, wherein the task-oriented motion comprises movement of upper limbs of the user or movement of lower limbs of the user, wherein the movement of the upper limbs comprises one or more of a shoulder range-of-motion (ROM) task, an elbow ROM task, a wrist ROM task, and a finger ROM task.

12. The system of claim 9, further comprising:
at least one data collection device configured to collect data related to at least one of attentiveness, level of completion, performance assessment values, and vigilance latency of the user.

13. The system of claim 9, wherein the display component is further configured to display at least one of one or more additional virtual characters, props, and scene elements, and wherein each of the one or more additional virtual characters is human or non-human.

14. The system of claim 13, wherein the user interacts with at least one of the one or more additional virtual characters, props, and scene elements, and wherein the interaction reinforces the intent to imitate the at least one physical action.

15. The system of claim 9, wherein the virtual scenario comprises at least one of one or more technologies including virtual reality, augmented reality, and holography, and wherein the display component comprises at least one of one or more of a 2D display, a 2D stereo display, a 3D display, and a 3D stereo display.

16. A method for rehabilitating a user, the method comprising:
displaying a virtual scenario to a user using a screen or a head-mounted display, wherein the virtual scenario is designed for motor impairment recovery, wherein the virtual scenario comprises a virtual character performing at least one physical action, wherein the at least one physical action is smooth, coordinated, and representative of life-like movements depicting successful achievement of prescribed goals; and
playing at least one verbal hypnotic suggestion to the user using an audio component; and
displaying at least one non-verbal hypnotic suggestion to the user using at least the screen or the head-mounted display, wherein the at least one non-verbal hypnotic suggestion comprises virtual visualization, wherein a combination of displaying the virtual character, the at least one verbal hypnotic suggestion, and the at least one non-verbal hypnotic suggestion instructs the user to imitate the at least one physical action by the user, and wherein the imitation of the at least one physical action by the user is translated into smooth, pre-directed motion to the virtual character regardless of a quality of the imitation.

17. The method of claim 16, wherein the at least one physical action comprises a task-oriented motion.

18. The method of claim 16, further comprising:
collecting data, wherein at least one data collection device is provided for collecting the data related to at least one of attentiveness, level of completion, performance assessment values, and vigilance latency of the user.

19. The method of claim 16, wherein the virtual scenario comprises at least one of one or more additional virtual characters, props, and scene elements, and wherein each of the one or more additional virtual characters is human or non-human.

20. The method of claim 19, wherein the user interacts with at least one of the one or more additional virtual characters, props, and scene elements, and wherein the interaction reinforces the intent to imitate the at least one physical action.

* * * * *